Oct. 7, 1930.  A. FAY ET AL  1,777,484
ANIMAL RACING DEVICE
Filed Nov. 7, 1927  2 Sheets-Sheet 1

Oct. 7, 1930. A. FAY ET AL 1,777,484
ANIMAL RACING DEVICE
Filed Nov. 7, 1927 2 Sheets-Sheet 2

INVENTORS
Alpheus Fay
John L. Zehnder
BY
ATTORNEY

Patented Oct. 7, 1930

1,777,484

UNITED STATES PATENT OFFICE

ALPHEUS FAY AND JOHN L. ZEHNDER, OF LOUISVILLE, KENTUCKY

ANIMAL-RACING DEVICE

Application filed November 7, 1927. Serial No. 231,608.

Our invention relates to race courses wherein a lure passing around the course induces animals, such as dogs, to race therearound. Its object is to make such a device simpler and less expensive to construct and operate, and adapted to operate with greater safety and at higher speeds than devices heretofore in use. An especial object is to make such a device readily portable, whereby the amusement may be transferred from one locality to another, after the manner of a circus; thereby making the project less dependent upon local popularity or legal requirements for its commercial success, and available to less populous communities where a permanent installation could not become profitable. The present invention includes structure disclosed and claimed in our copending application Serial No. 231,609, filed November 7, 1927. The above, and other objects which will appear in the course of the following description, are attained by the device illustrated, for example, in the accompanying drawings, in which—

Figure 1:
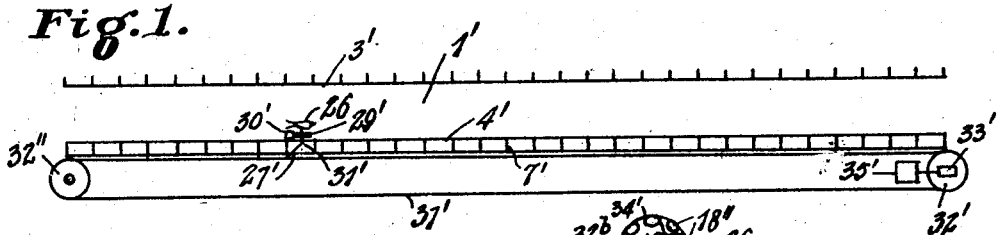
Fig. 1 is a diagrammatic plan view of a straight race course embodying our improvement.
Figure 4:
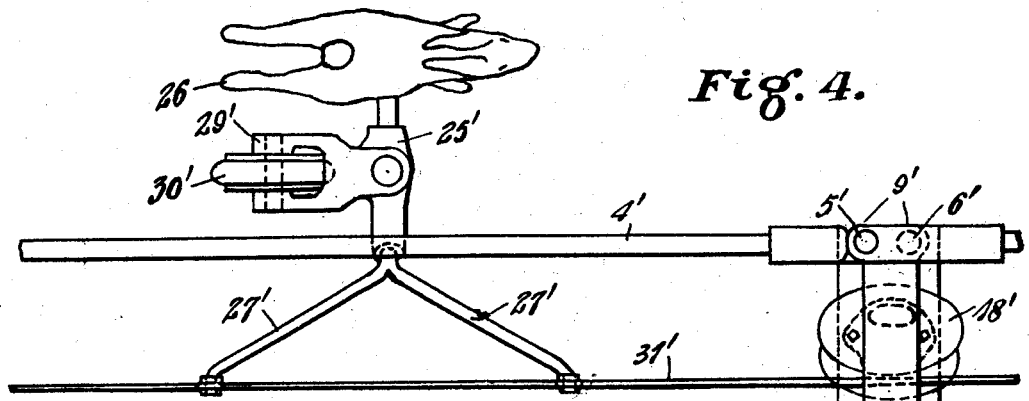
Fig. 4 is a similar view of another part of the course of Figs. 2 and 3, or of Fig. 1.
Figure 5:
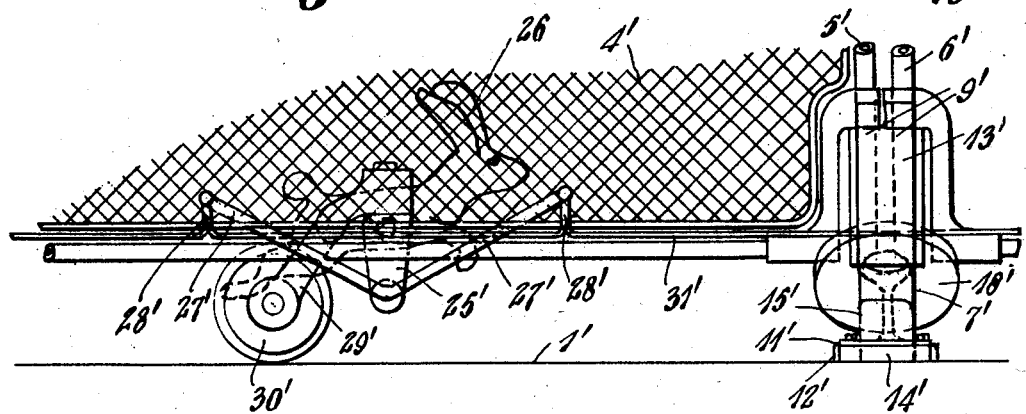
Fig. 5 is a side elevation, looking from off the race course.
Figure 6:
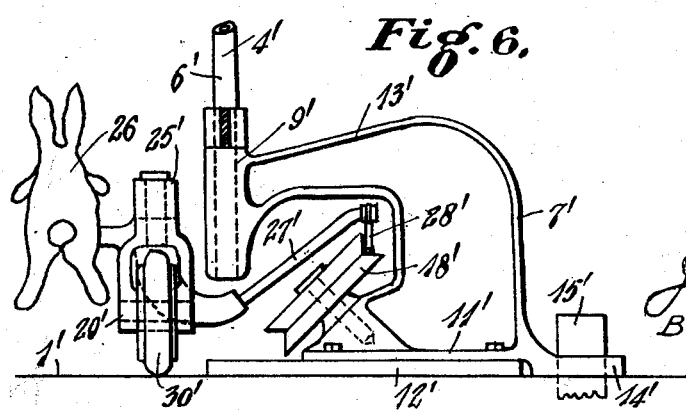
Fig. 6 is a cross-sectional end elevation of the same.

The race course illustrated in Fig. 1 consists of a race track 1' with a fence 3' at one side, and a fence 4' at the other side which is supported by brackets 7', see Figs. 4, 5 and 6, having sockets 9' receiving the end posts 5' and 6' of the fence 4'. Each bracket 7' comprises a base 11' screwed to a base board 12' resting on the ground; and an arm 13' extending along over the base board 12' to and integral with the sockets 9'; and an eye 14' projected down onto the ground at the opposite end of the base board, where a stake 15' is driven through the eye into the ground. Such a structure is described and claimed in our copending application above mentioned. Under the arm 13' is a stud projecting up from the base part of the bracket and inclining over toward the fence 4', on which stud is journaled a roller 18' having a grooved periphery. The cable 31' travels on these rollers 18' and is endless, passing around drums 32' and 32'' at respective ends of the course. The drum 32' is driven by a motor 35' to which it is operatively connected by the worm gearing 33'. The lure 26 is on the outer end of an arm projecting over the race track from a bracket 25' to which is swiveled a fork 29' in which is journaled a wheel 30' which supports and trails after the bracket 25'. This bracket 25' is connected to the cable 31' by diverging arms 27', the ends of which are caught in upwardly formed loops of the cable, which loops are held in shape by ferrules 28'; such a fastening being compact enough to pass readily around the drums 32' and 32''.

Figure 2:
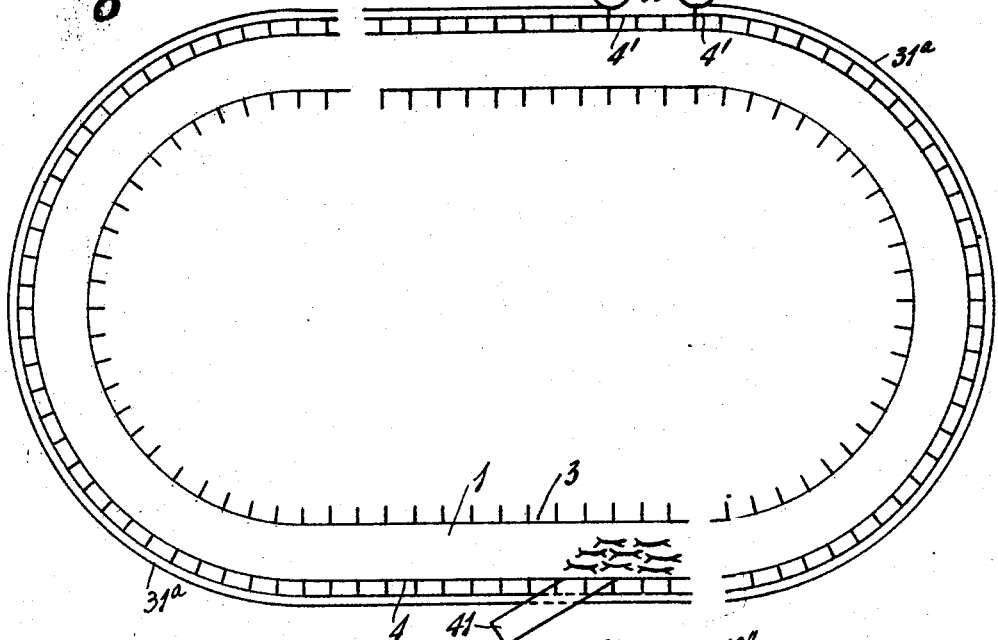
Fig. 2 is a similar view of an endless race course embodying the improvement of Fig. 1.
Figure 3:
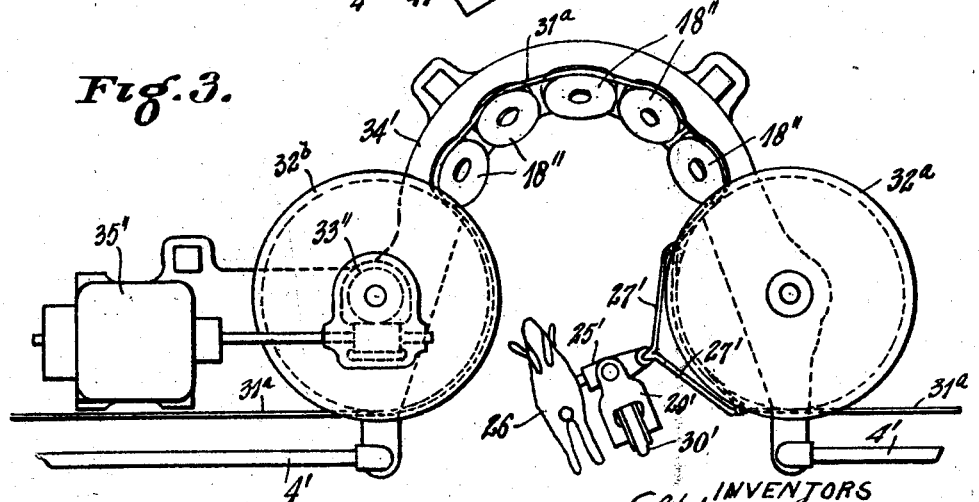
Fig. 3 is an enlarged plan view of the driving mechanism of Fig. 2, showing how the lure passes therearound.

In the endless course of Figs. 2 and 3 the single cable 31ᵃ passes around an idler drum 32ᵃ and then along over a series of rollers 18'' on inclined axes like the rollers 18' of the brackets 7', and then around the driving drum 32ᵇ, which is driven by the motor 35'' through the medium of the worm gearing 33''. The drums and rollers, together with the motor, are mounted on a bed 34' which is U-shaped between the drums, with the rollers 18'' arranged closely together around the curve of the U shape in such relation that the cable passes almost half way around each drum whereby good driving contact with the drum is had. This bed has extensions on which the fence sections 4' are supported, with a gap in the fence to permit the lure and its carrier mechanism to travel on the ground, around between the drums, with the inner arms 27' passing the row of rollers 18'' in the same way that they pass the rollers 18' throughout the extent of the race course.

In any example, a suitable cage 41 (Fig. 2) may be used for the racing animals.

What we claim as new and desire to secure by Letters Patent is:

1. In combination with the ground of a race course, flexible means along said course, a lure supported solely by said ground and said flexible means, and means for driving said flexible means.

2. In combination with a race course, a lure, a support for said lure, diverging extensions on said support, a cable having loops embracing the respective extensions, and rotary driving means around which said cable passes.

3. In combination with a race course, a lure, a support for said lure, a cable connected to said support, drums spaced apart, rollers arranged in a curved series between said drums, said cable passing around one drum, then around the sides of said rollers remote from said drum, and then around the other drum, carrying said lure into the space between said drums and out again, and means for driving one of said drums.

4. In combination with the ground of a race course, a lure traveling on said ground, a drum stationed beside said course at a tangent to the direction of said course, and flexible means passing at least partly around said drum and operatively connected with said lure.

5. In combination with a race course, a lure traveling on said course, stationed motive means for the lure, flexible means operatively connecting the lure to its motive means, and rollers at intervals along the course, on axes inclined upward and away from said flexible means, having grooved peripheries supporting said flexible means against displacement both downward and horizontally.

ALPHEUS FAY.
JOHN L. ZEHNDER.